(12) United States Patent
Lee et al.

(10) Patent No.: US 7,670,548 B2
(45) Date of Patent: Mar. 2, 2010

(54) LEAD FREE SOLDER CONTAINING SN, AG AND BI

(75) Inventors: Young Woo Lee, Incheon (KR); Kyung In Kang, Gyeonggi-do (KR); Byung Wook Jeong, Chungcheongbuk-do (KR); Jai Pil Jung, Seoul (KR); Ki Ju Lee, Seoul (KR); Hee Yul Lee, Seoul (KR)

(73) Assignee: MK Electron Co., Ltd., Yongin (KR)

( * ) Notice: Subject to any disclaimer, the term of this patent is extended or adjusted under 35 U.S.C. 154(b) by 4 days.

(21) Appl. No.: 12/019,687

(22) Filed: Jan. 25, 2008

(65) Prior Publication Data

US 2008/0308189 A1  Dec. 18, 2008

(30) Foreign Application Priority Data

Jun. 18, 2007 (KR) .................... 10-2007-0059517

(51) Int. Cl.
 *C22C 13/02* (2006.01)
(52) U.S. Cl. ..................................... 420/562
(58) Field of Classification Search ................. 420/557, 420/562
 See application file for complete search history.

(56) References Cited

U.S. PATENT DOCUMENTS

| | | | | | |
|---|---|---|---|---|---|
| 5,256,370 | A | * | 10/1993 | Slattery et al. | 420/557 |
| 5,439,639 | A | * | 8/1995 | Vianco et al. | 420/562 |
| 5,851,482 | A | * | 12/1998 | Kim | 420/557 |
| 6,648,210 | B1 | * | 11/2003 | Steen | 228/179.1 |
| 6,790,333 | B2 | * | 9/2004 | Ishiyama | 205/104 |
| 6,893,512 | B2 | * | 5/2005 | Kitajima et al. | 148/400 |

* cited by examiner

*Primary Examiner*—Melvin C Mayes
*Assistant Examiner*—Stefanie Cohen
(74) *Attorney, Agent, or Firm*—Volpe and Koenig, P.C.

(57) ABSTRACT

A lead free solder is provided. The lead free solder includes about 1.5 wt % to about 2.5 wt % silver (Ag), about 3 wt % to about 6 wt % bismuth (Bi), about 0.005 wt % to about 0.1 wt % of a deoxidizing agent, and a balance of tin (Sn). The lead free solder has improved wettability, a lowered melting point, little or substantially no formation of oxidation layer in a solder bath, suppressed brittleness, improved thermal shock resistance and drop resistance.

18 Claims, 1 Drawing Sheet

LEAD FREE SOLDER CONTAINING SN, AG AND BI

CROSS REFERENCE TO RELATED APPLICATION

This application claims the benefit of Korean Patent Application No. 10-2007-0059517, filed on Jun. 18, 2007, in the Korean Intellectual Property Office, the disclosure of which is incorporated herein in its entirety by reference.

FIELD OF INVENTION

The present invention relates to lead free solders, and more particularly, to Sn—Ag—Bi based lead free solders.

BACKGROUND

A lead free solder is a lead (Pb) free conducting material for bonding electronic components, lead being a substance that is harmful to humans.

Due to increasing environmental concerns, legal restrictions in using lead are growing stricter all over the world. In order to confront such legal restriction, recently, development of lead free solders as alternatives to lead solders has been vigorously carried out.

As an example of a lead free solder, there are Sn—Ag—Cu based solders. Among Sn—Ag—Cu based solders, a representative lead free solder having a Sn-3Ag-0.5Cu composition has a high melting point in a range from approximately 217 to 219° C., which means that soldering should be carried out at high temperature, which can lead to heat damage being caused to electronic components.

SUMMARY

The present invention provides a lead free solder having improved wettability and a low melting point.

According to an aspect of the present invention, there is provided a lead free solder comprising about 1.5 wt % to about 2.5 wt % silver (Ag), about 3 wt % to about 6 wt % bismuth (Bi), about 0.005 wt % to about 0.1 wt % of a deoxidizing agent, and a balance of tin (Sn). The lead free solder has improved wettability, a lowered melding point, little or substantially no formation of oxidation layer in a solder bath, suppressed brittleness, improved thermal shock resistance and improved drop resistance.

The deoxidizing agent may be at least one metal selected from the group consisting of aluminum (Al), silicon (Si), manganese (Mn), titanium (Ti) and lithium (Li). Specifically, the deoxidizing agent may be aluminum (Al).

The deoxidizing agent may be contained in an amount from about 0.005 wt % to about 0.05 wt %. In this case, the wettability of the solder can further be improved.

Here, bismuth (Bi) may be contained in an amount from about 4.5 wt % to about 6 wt %. In this case, the wettability of the solder can further be improved and the melting point of the solder can further be lowered.

In addition, silver (Ag) may be contained in an amount from about 1.7 wt % to about 2.3 wt %. In this case, the thermal shock resistance and drop resistance of the solder can further be improved.

The lead free solder preferably have a melting point ranging from about 203° C. to about 210° C., more preferably from about 204° C. to about 207° C.

According to another aspect of the present invention, there is provided a lead free solder consisting essentially of about 1.5 wt % to about 2.5 wt % silver (Ag), about 3 wt % to about 6 wt % bismuth (Bi), about 0.005 wt % to about 0.1 wt % of aluminum (Al), and a balance of tin (Sn).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
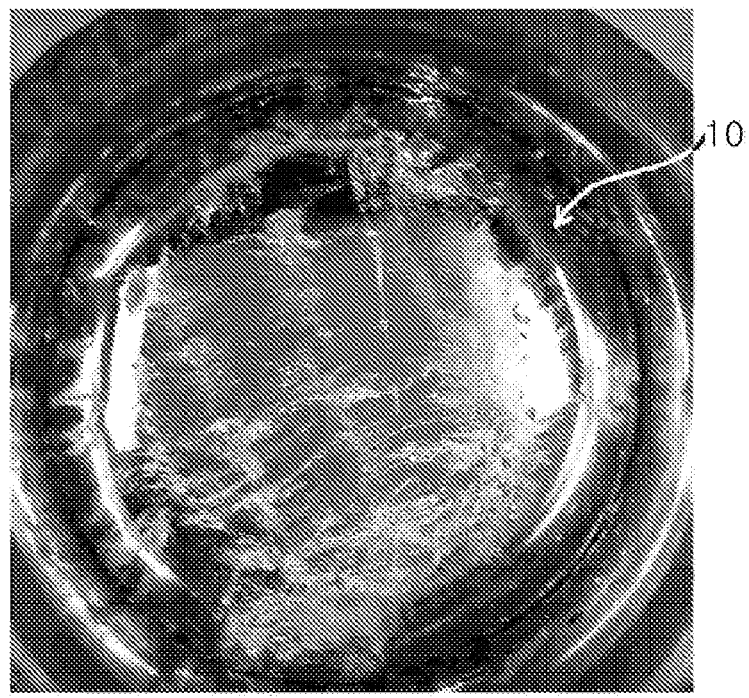
FIG. 1 is a photograph of a solder bath according to Example 5.

Hereinafter, a detailed description will be given of the preferred embodiments of the present invention, with reference to the appended drawings.

A lead free solder according to an embodiment of the present invention includes silver (Ag), bismuth (Bi), a deoxidizing agent, and a balance of tin (Sn).

The lead free solder may contain the deoxidizing agent in an amount from about 0.005 wt % to about 0.1 wt %. When the amount of the deoxidizing agent falls within this range, wettability of the solder is noticeably improved and a melting point thereof is also significantly reduced, compared to that of Sn-3Ag-0.5Cu solder. However, if the amount of the deoxidizing agent contained in the solder is less than about 0.005 wt %, i.e., an insignificant amount, improvement of wettability, and lowering of a melting point are difficult to attain. If the amount of the deoxidizing agent contained in the solder is greater than about 0.1 wt %, a thick oxide layer may be formed in a solder bath, resulting in deterioration of the solder bath. Further, the amount of the deoxidizing agent may be in a range from about 0.005 to about 0.05 wt %. When the amount of the deoxidizing agent falls within this the range, wettability of the solder can further be improved.

The deoxidizing agent may be at least one metal selected from the group consisting of aluminum (Al), silicon (Si), manganese (Mn), titanium (Ti) and lithium (Li). More specifically, the deoxidizing agent may be aluminum (Al).

The solder may contain about 3 wt % to about 6 wt % bismuth (Bi). In this case, wettability of the solder is noticeably improved compared to that of Sn-3Ag-0.5Cu solder. In addition, a melting point of the solder is also significantly lowered compared to that of Sn-3Ag-0.5Cu solder. However, if the amount of bismuth (Bi) contained in the solder is less than about 3 wt %, improvement of wettability and lowering of the melting point are hardly attainable. If the amount of bismuth (Bi) contained in the solder is greater than about 6 wt %, hardness of the solder is markedly increased, so that the solder may become brittle. Further, the amount of bismuth (Bi) is preferably in a range from about 4.5 to about 6 wt %. In this case, the melting point of the solder can further be lowered while further improving wettability.

The solder may contain about 1.5 wt % to about 2.5 wt % silver (Ag). In this case, thermal shock resistance of the solder is noticeably improved, compared to a case when the amount of silver (Ag) is less than about 1.5 wt %. In addition, resistance to shock caused by dropping is greatly improved compared to a case when the amount of silver (Ag) is greater than about 2.5 wt %. Furthermore, in order to achieve further improvement of thermal shock resistance and resistance to shock caused by dropping, the amount of silver (Ag) is preferably in a range from about 1.7 wt % to about 2.3 wt %.

As described above, the lead free solder has improved wettability compared to Sn-3Ag-0.5Cu alloy solder, thereby enhancing workability during a soldering process. In addition, the lead free solder may have a melting point ranging from about 203° C. to about 210° C., more preferably from about 204° C. to about 207° C. That is to say, the melting point of the lead free solder is lower than that of Sn-3Ag-0.5Cu alloy solder, being approximately 217° C. Thus, when soldering electronic components, the use of the lead free solder according to the present invention can help prevent the electronic components being thermally damaged.

The lead free solder of the present invention may be formed into various shapes such as balls, cream, bars, wires and the like.

In one embodiment, as master alloys, Sn—Ag alloy, Sn—Bi alloy and Sn—Al alloy are prepared, Sn is then melted in a furnace, the Sn—Ag alloy, Sn—Bi alloy and Sn—Al alloy are sequentially melted to produce a solder bath, a temperature of which is maintained at a temperature ranging from approximately 600° C. to approximately 650° C. for a predetermined time, followed by a tapping process to produce bar-type solders.

Then, the bar-type solders are melted to produce ball-type solders, cream-type solders, or wire-type solders.

For a better understanding of the present invention, the invention will now be described based on examples, but the scope of the present invention is not limited to the specific examples presented here.

Comparison of the Wettability, Melting Points and Oxide Layer Formation in the Solder Bath Depending on a Compositional Change in the Deoxidizing Agent baths containing 0.005 wt % to 0.05 wt % of Al (Examples 1-4) and substantially no difference was observed from the photographs between Example 5 and each of Examples 1-4.

Based on these findings, the inventors of the present invention discovered that an amount of a deoxidizing agent in the Sn—Ag—Bi—Al solder, i.e., aluminum (Al), was preferably not greater than about 0.1 wt %.

(2) Comparison of Wettability Data

A solder checker (Model SAT-5000 by Rhesca Co., Ltd.) was used to determine wettability of each of the solders according to Examples 1 through 5 and Comparative Example 2. Specifically, an oxygen-free copper wire having a size of 30 mm in length×10 mm in width×0.3 mm thickness was immersed to a depth of 2 mm into a solder bath maintained at 250° C. at a speed of 2 mm/sec to measure a zero-cross time thereof. The zero-cross time of each sample solder was measured according to the standard test method of JIS Z 3198-4 and the results are summarized in Table 1.

As is evident from Table 1, the zero-cross times of the solders according to Examples 1 to 5, which range from 0.718 sec to 0.922 sec, were remarkably lowered, compared to the zero-cross time of the solder according to Comparative Example 2, that is, 1.418 sec. In other words, the solders according to Examples 1 to 5 have noticeably improved wettability compared to the solder according to Comparative Example 2, i.e., Sn-3Ag-0.5Cu solder.

Meanwhile, the zero-cross times of the solders containing 0.005 wt % to 0.05 wt % of Al (Examples 1-4), which range from 0.718 sec to 0.753 sec, were further lowered, compared to the zero-cross time of the solder containing 0.1 wt % of Al (Example 5), that is, 0.922 sec. This suggests that the wettability of each of the solders according to Examples 1 to 4 is better than that of the solder according to Example 5. Based on this finding, the inventors of the present invention discovered that an amount of a deoxidizing agent in the Sn—Ag—Bi—Al solder, i.e., aluminum (Al), was more preferably in a range from about 0.005 wt % to about 0.05 wt %.

(3) Comparison of DSC (Differential Scanning Calorimeter) Melting Points

Melting points of the solders according to Examples 1 to 5, and Comparative Example 2 were determined by DSC (Differential Scanning Calorimeter) (DSC S-650 manufactured by Scinco). Specifically, temperatures of the sample solders were elevated in a range from 25° C. to 240° C. in air at a scanning rate of 10° C./min to then measure melting points, and the results are summarized in Table 1. The melting point is a temperature at which heat flow is the minimum on a DSC graph illustrating a heat flow-versus-temperature relationship.

TABLE 1

| | Composition (wt %) | | | | Properties | |
|---|---|---|---|---|---|---|
| | Tin (Sn) | Silver (Ag) | Bismuth (Bi) | Aluminum (Al) | Zero-cross time (sec) | Melting point (° C.) |
| Example 1 | Balance | 2 | 5 | 0.005 | 0.753 | 204 |
| Example 2 | Balance | 2 | 5 | 0.008 | 0.726 | 204 |
| Example 3 | Balance | 2 | 5 | 0.01 | 0.718 | 204 |
| Example 4 | Balance | 2 | 5 | 0.05 | 0.734 | 206 |
| Example 5 | Balance | 2 | 5 | 0.1 | 0.922 | 207 |
| Comparative Example 1 | Balance | 2 | 5 | 0.15 | — | — |
| Comparative Example 2 | Balance of Sn, 3 wt % of Ag, 0.5 wt % of Cu | | | | 1.418 | 217 |

Solders having such compositions as shown in Table 1 according to Examples 1 through 5 and Comparative Examples 1 and 2 were prepared.

(1) Comparison of Oxide Layer Formation Solder Bath

Figure 2:
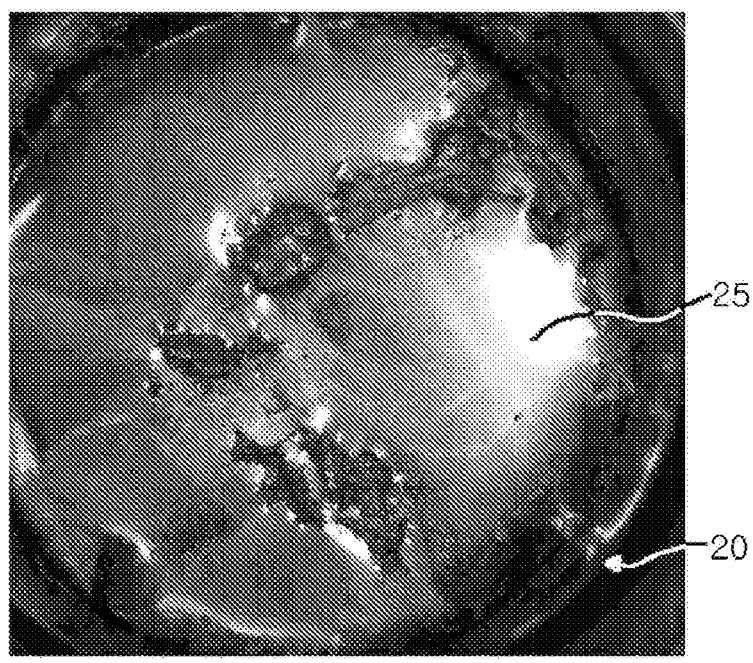
FIG. 2 is a photograph of a solder bath according to Comparative Example 1.

FIG. 1 is a photograph of a solder in a solder bath 10 (650° C.) according to Example 5 and FIG. 2 is a photograph of a solder in a solder bath 20 (650° C.) according to Comparative Example 1.

Referring to FIGS. 1 and 2, whereas a thick oxide layer 25 was formed on a surface of the solder bath 20 containing 0.15 wt % of Al (Comparative Example 1), only a thin oxide layer was formed on a surface of the solder bath 10 containing 0.1 wt % of Al (Example 5). In addition, although not shown in the drawings, only thin oxide layers were formed in solder Referring to Table 1, the melting points of the solders according to Examples 1 to 5, which range from 204° C. to 207° C., were remarkably lowered, compared to the melting point of the solder according to Comparative Example 2, i.e., 217° C. In other words, the solders according to Examples 1 to 5 have noticeably lowered melting points compared to the solder according to Comparative Example 2, i.e., Sn-3Ag-0.5Cu solder.

(4) Conclusion

As described above, from the viewpoints of wettability, melting point and oxide layer formation in the solder bath, the deoxidizing agent in the Sn—Ag—Bi—Al solder, i.e., Al, is preferably in a range of not greater than about 0.1 wt %. When the Al amount falls within this range, the solder exhibits remarkably improved wettability and a considerably lowered melting point compared to the conventional Sn-3Ag-0.5Cu solder. However, if the Al amount in the solder is less than about 0.005 wt %, i.e., an insignificant amount, improvement of wettability, and lowering of the melting point are difficult to attain. Accordingly, in the Sn—Ag—Bi—Al solder, the deoxidizing agent, i.e., Al, is preferably used in an amount of about 0.005 to about 0.1 wt %. The Sn—Ag—Bi—Al solders containing about 0.005 wt % to about 0.1 wt % of Al preferably have melting points ranging from about 204° C. to about 207° C. That is to say, the melting point of the lead free solder is lower than that of Sn-3Ag-0.5Cu alloy solder, being approximately 217° C. Moreover, an amount of Al contained in the Sn—Ag—Bi—Al solder is more preferably in a range from about 0.005 wt % to about 0.05 wt % so as to further improve solder wettability.

Comparison of Wettability, Melting Point and Hardness of Solders Depending on Compositional Change of Bi which heat flow is the minimum on a DSC graph illustrating a heat flow-versus-temperature relationship.

Referring to Table 2, the melting points of the solders according to Examples 6 to 11, which range from 203° C. to 210° C., were remarkably lowered, compared to the melting point of the solder according to Comparative Example 2, i.e., 217° C. In other words, the solders according to Examples 6 to 11 have noticeably lowered melting points compared to the solder according to Comparative Example 2, i.e., Sn-3Ag-0.5Cu solder.

In addition, the melting points of the solders containing 3 wt % to 6 wt % of Bi (Examples 6 to 11), which range from 203° C. to 210° C., were remarkably lowered, compared to the melting point of the solder according to Comparative Example 3, i.e., 216° C. The solder according to Comparative Example 3 has a melting point similar to that of the solder according to Comparative Example 2.

Therefore, the inventors of the present inventions discovered that an amount of Bi in the Sn—Ag—Bi—Al solder was preferably not less than about 3 wt %.

Meanwhile, melting points of the solders containing 4.5 wt % to 6 wt % of Bi (Examples 8-11), which range from 203° C. to 204° C., were further lower than those of the solders respectively containing 3 wt % and 4 wt % of Bi (Examples 6-7), i.e., 210° C. and 209° C., respectively. Therefore, the inventors of the present inventions discovered that an amount of Bi in the Sn—Ag—Bi—Al solder was more preferably not less than about 4.5 wt %.

(2) Comparison of Wettability Data

A solder checker (Model SAT-5000 by Rhesca Co., Ltd.) was used to determine wettability of each of the solders according to Examples 6 through 11 and Comparative Examples 2 through 4. Specifically, an oxygen-free copper wire having a size of 30 mm in length×10 mm in width×0.3

TABLE 2

| | Composition (wt %) | | | | Properties | | |
|---|---|---|---|---|---|---|---|
| | Tin (Sn) | Silver (Ag) | Bismuth (Bi) | Aluminum (Al) | Zero-cross time (sec) | Melting point (° C.) | Hardness (Hv) |
| Example 6 | Balance | 2 | 3 | 0.01 | 0.881 | 210 | 5.38 |
| Example 7 | Balance | 2 | 4 | 0.01 | 0.843 | 209 | 5.47 |
| Example 8 | Balance | 2 | 4.5 | 0.01 | 0.796 | 204 | 5.84 |
| Example 9 | Balance | 2 | 5 | 0.01 | 0.718 | 204 | 6.144 |
| Example 10 | Balance | 2 | 5.5 | 0.01 | 0.722 | 204 | 6.273 |
| Example 11 | Balance | | 6 | 0.01 | 0.713 | 203 | 6.588 |
| Comparative Example 3 | Balance | 2 | 2.5 | 0.01 | 1.124 | 216 | 4.836 |
| Comparative Example 4 | Balance | 2 | 6.5 | 0.01 | 0.62 | 203 | 7.84 |
| Comparative Example 2 | Balance of Sn, 3 wt % of Ag, 0.5 wt % of Cu | | | | 1.418 | 217 | — |

Solders having such compositions as shown in Table 2 according to Examples 6 through 11 and Comparative Examples 2 through 4 were prepared.

(1) Comparison of DSC Melting Points

Melting points of the solders according to Examples 6 to 11, and Comparative Examples 2 to 4 were determined by DSC (DSC S-650 manufactured by Scinco). Specifically, temperatures of the sample solders were raised in a range from 25° C. to 240° C. in air at a scanning rate of 10° C./min to then measure the melting points thereof, and the results are summarized in Table 2. The melting point is a temperature at mm thickness were immersed to a depth of 2 mm into a solder bath maintained at 250° C. at a speed of 2 mm/sec to measure zero-cross time. The zero-cross time of each sample solder was measured according to the standard test method of JIS Z 3198-4 and the results are summarized in Table 2.

As is evident from Table 2, the zero-cross times of the solders according to Examples 6 to 11, which range from 0.713 sec to 0.881 sec, were remarkably lowered, compared to the zero-cross time of the solder according to Comparative Example 2, that is, 1.418 sec. In other words, the solders according to Examples 6 to 11 have noticeably improved wettability compared to the solder according to Comparative Example 2, i.e., Sn-3Ag-0.5Cu solder.

Meanwhile, the zero-cross times of the solders containing 3 wt % to 6 wt % of Bi (Examples 6-11), which range from 0.713 sec to 0.881 sec, were further lowered, compared to the zero-cross time of the solder containing 2.5 wt % of Bi (Comparative Example 3), that is, 1.124 sec. Based on this finding, the inventors of the present invention discovered that an amount of Bi in the Sn—Ag—Bi—Al solder was preferably not less than about 3 wt %.

(3) Comparison of Hardness Data

A hardness tester (AVK-02 manufactured by Mitutoyo) was used to measure Vickers hardness of each of the solders according to Examples 6 to 11, and Comparative Examples 2 to 4. The measurements were made with a tensile strength of 1 kgf for 10 seconds and the measurement results are summarized in Table 2.

Referring to Table 2, values of Vickers hardness (Hv) of the solders containing 3 wt % to 6 wt % of Bi (Examples 6 to 11), which range from 5.38 to 6.588, were noticeably lowered compared to the Vickers hardness (Hv) of the solder containing 6.5 wt % of Bi (Comparative Example 4), i.e., 7.84. This suggests that the solder according to Comparative Example 4 is easily breakable, that is, has high brittleness, compared to the solders according to the solders according to Examples 6 to 11. Based on this finding, the inventors of the present invention discovered that an amount of Bi in the Sn—Ag—Bi—Al solder was preferably not greater than about 6 wt %.

(4) Conclusion

From the viewpoints of melting point, wettability, and hardness, Bi in the Sn—Ag—Bi—Al solder preferably ranges from about 3 wt % to about 6 wt %. When the Bi amount falls within this range, the solder wettability was notably improved and the melting points were considerably lowered, compared to the case of the Sn-3Ag-0.5Cu alloy solder. To be certain, the Sn—Ag—Bi—Al solders containing about 3 wt % to about 6 wt % of Bi have melting points range from about 203° C. to about 210° C. Moreover, an amount of Bi contained in the Sn—Ag—Bi—Al solder is more preferably in a range from about 4.5 wt % to about 6 wt % so as to further improve solder wettability.

Comparison of Thermal Shock Resistance and Drop Resistance of Solders Depending on Compositional Change of Ag (1) Thermal Shock Test The semiconductor packages using the solders according to Examples 12 to 16, and Comparative Examples 5 and 6 were subjected to a thermal shock test. The thermal shock test was conducted 1000 cycles. In the unit cycle, after the temperature sustained at −45° C. for 30 minutes, the temperature was sharply raised to 125° C. and then sustained for 30 minutes. After each cycle was completed, crack occurrence at solder joints was investigated. If crack occurrence was identified, the test was interrupted and counts of thermal shock test cycles were listed in Table 3. The symbol "P" in Table 3 indicates that no cracks are produced in solder joints, even after 1000 cycles.

As evident from Table 3, the semiconductor package using the solders containing 1.5 wt % of Ag (Example 12) generate cracks at their solder joints after 700 cycles, and the semiconductor packages using the solders containing 1.7 wt % to 2.5 wt % of Ag (Examples 13 to 16) did not generate cracks at their solder joints until 1000 cycles of thermal shock test were conducted. On the other hand, the semiconductor package using the solders containing 1.2 wt % of Ag (Comparative Example 5) generated cracks at its solder joint after 400 cycles of thermal shock test. Accordingly, the solders according to Examples 12 to 16 have much higher thermal shock resistance than the solder according to Comparative Example 5. Based on this finding, the inventors of the present invention discovered that an amount of Ag in the Sn—Ag—Bi—Al solder was preferably not less than about 1.5 wt %.

In addition, the solders according to Examples 13 to 16 have higher thermal shock resistance than the solder according to Example 12. Based on this finding, the inventors of the present invention discovered that an amount of Ag in the Sn—Ag—Bi—Al solder was more preferably not less than about 1.7 wt %.

(2) Drop Test

The semiconductor packages using the solders according to Examples 12 to 16, and the solders according to Comparative Examples 5 and 6 were subjected to a drop test. The drop resistance of each sample solder was measured according to the standard test method of JESD22-B104. To be certain, the semiconductor packages using the solders according to Examples 12 to 16, and the solders according to Comparative Examples 5 and 6 were dropped, and electrical resistance of a solder joint of each semiconductor package was then measured. When the electrical resistance exceeds 10Ω, dropping was interrupted, and counts of drop test repeated were listed in Table 3. The symbols "P" in Table 3 indicate that the electrical resistance of the solder joint was not greater than 10Ω even after the drop test was repeated 100 times.

As evident from Table 3, the semiconductor package using the solders containing 2.5 wt % of Ag (Example 16) had

TABLE 3

| | Composition (wt %) | | | | Properties | |
|---|---|---|---|---|---|---|
| | Tin (Sn) | Silver (Ag) | Bismuth (Bi) | Aluminum (Al) | Thermal shock test | Drop test |
| Example 12 | Balance | 1.5 | 5 | 0.01 | 700 | P |
| Example 13 | Balance | 1.7 | 5 | 0.01 | P | P |
| Example 14 | Balance | 2 | 5 | 0.01 | P | P |
| Example 15 | Balance | 2.3 | 5 | 0.01 | P | P |
| Example 16 | Balance | 2.5 | 5 | 0.01 | P | 50 |
| Comparative Example 5 | Balance | 1.2 | 5 | 0.01 | 400 | P |
| Comparative Example 6 | Balance | 2.7 | 5 | 0.01 | P | 10 |

Solders having such compositions as shown in Table 3 according to Examples 12 through 16 and Comparative Examples 5 and 6 were prepared and semiconductor packages were manufactured by solder-bonded PCBs and semiconductor chips using the solders.

electrical resistance exceeding 10Ω at its solder joint after subjecting to 50 times of drop test, and the semiconductor packages using the solders containing 1.5 wt % to 2.3 wt % of Ag (Examples 12 to 15) had electrical resistances of not greater than 10Ω at their solder joints, even after the drop test was repeated 100 times. On the other hand, the semiconductor package using the solders containing 2.7 wt % of Ag (Comparative Example 6) had electrical resistance exceeding 10Ω at its solder joint after subjecting to 10 times of drop test. Accordingly, the solders according to Examples 12 to 16 have much higher drop resistance than the solder according to Comparative Example 6. Based on this finding, the inventors of the present invention discovered that an amount of Ag in the Sn—Ag—Bi—Al solder was preferably not greater than about 2.5 wt %.

In addition, the solders according to Examples 12 to 15 have higher drop resistance than the solder according to Example 16. Based on this finding, the inventors of the present invention discovered that an amount of Ag in the Sn—Ag—Bi—Al solder was more preferably not greater than about 2.3 wt %.

(3) Conclusion

From the viewpoints of the thermal shock test and drop test results, Ag in the Sn—Ag—Bi—Al solder preferably ranges from about 1.5 to about 2.5 wt %, more preferably from about 1.7 to about 2.3 wt %.

As described above, the Sn—Ag—Bi—Al solder according to the present invention has improved wettability, thereby enhancing workability during a soldering process, compared to the Sn-3Ag-0.5Cu alloy. In addition, since melting point of the Sn—Ag—Bi—Al solder is lower than that of the Sn-3Ag-0.5Cu alloy solder, it can protect the electronic components from thermal damage when soldering of electronic components is being performed.

Further, since the Sn—Ag—Bi—Al solder contains about 0.005 wt % to about 0.1 wt % of Al, solder wettability can be improved and the melting point of the solder can be lowered. In addition, according to the present invention, little or substantially no oxide layer is formed in a solder bath. Moreover, wettability of the Sn—Ag—Bi—Al solder can further be improved by comprising about 0.005 wt % to about 0.05 wt % of Al.

In addition, the Sn—Ag—Bi—Al solders containing about 3 wt % to about 6 wt % of Bi have improved solder wettability, lowered melting points, and low hardness values. Further, the Sn—Ag—Bi—Al solder contains about 4.5 wt % to about 6 wt % of Bi, thereby further lowering a melting point of the solder.

Further, the Sn—Ag—Bi—Al solder contains about 1.5 wt % to about 2.5 wt % of Ag, thereby improving thermal shock resistance and drop resistance. Moreover, the Sn—Ag—Bi—Al solder comprises about 1.7 wt % to about 2.3 wt % of Ag, thereby further improving thermal shock resistance and drop resistance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lead free solder consisting essentially of 1.5 wt % to about 2.5 wt % silver (Ag), about 3 wt % to about 6 wt % bismuth (Bi), about 0.005 wt % to about 0.1 wt % of a deoxidizing agent, and a balance of tin (Sn).

2. The lead free solder of claim 1, wherein the deoxidizing agent is at least one metal selected from the group consisting of aluminum (Al), silicon (Si), manganese (Mn), titanium (Ti) and lithium (Li).

3. The lead free solder of claim 2, wherein the deoxidizing agent is aluminum (Al).

4. The lead free solder of claim 1, wherein the deoxidizing agent is contained in an amount from about 0.005 wt % to about 0.05 wt %.

5. The lead free solder of claim 1, wherein bismuth (Bi) is contained in an amount from about 4.5 wt % to about 6 wt %.

6. The lead free solder of claim 1, wherein silver (Ag) is contained in an amount from 1.7 wt % to 2.3 wt %.

7. The lead free solder of claim 1, wherein the silver (Ag) is included in an amount of 1.7 wt % to 2.3 wt %, the bismuth (Bi) is included in an amount of about 4.5 wt % to about 6 wt % and the deoxidizing agent is included in an amount of about 0.005 wt % to about 0.05 wt %.

8. The lead free solder of claim 7, wherein the deoxidizing agent is at least one metal selected from the group consisting of aluminum (Al), silicon (Si), manganese (Mn), titanium (Ti) and lithium (Li).

9. The lead free solder of claim 8, wherein the deoxidizing agent is aluminum (Al).

10. The lead free solder of claim 1, wherein a melting point of the lead free solder ranges from about 230° C. to about 210° C.

11. The lead free solder of claim 10, wherein a melting point of the lead free solder ranges from about 204° C. to about 207° C.

12. A lead free solder consisting essentially of 1.5 wt % to 2.5 wt % silver (Ag), about 3 wt % to about 6 wt % bismuth (Bi), about 0.005 wt % to about 0.1 wt % of aluminum (Al), and a balance of tin (Sn).

13. The lead free solder of claim 12, wherein aluminum (Al) is contained in an amount from about 0.005 wt % to about 0.05 wt %.

14. The lead free solder of claim 12, wherein Bismuth (Bi) is contained in an amount from about 4.5 wt % to about 6 wt %.

15. The lead free solder of claim 12, wherein silver (Ag) is contained in an amount from 1.7 wt % to about 2.3 wt %.

16. The lead free solder of claim 12, wherein the silver (Ag) is included in an amount of 1.7 wt % to 2.3 wt %, the bismuth (Bi) is included in an amount of about 4.5 wt % to about 6 wt %, and the aluminum (Al) is included in an amount of about 0.005 wt % to about 0.05 wt %.

17. The lead free solder of claim 12, wherein a melting point of the lead free solder ranges from about 203° C. to about 210° C.

18. The lead free solder of claim 17, wherein a melting point of the lead free solder ranges from about 204° C. to about 207° C.

* * * * *